United States Patent
Tokumoto

(10) Patent No.: US 6,549,281 B2
(45) Date of Patent: Apr. 15, 2003

(54) MONOCHROMATOR AND SPECTROMETRIC METHOD

(75) Inventor: Isao Tokumoto, Tokyo (JP)

(73) Assignee: Advantest Corporation, Tokyo (JP)

( * ) Notice: Subject to any disclaimer, the term of this patent is extended or adjusted under 35 U.S.C. 154(b) by 3 days.

(21) Appl. No.: 09/870,954

(22) Filed: May 30, 2001

(65) Prior Publication Data

US 2002/0001081 A1 Jan. 3, 2002

(30) Foreign Application Priority Data

Jun. 1, 2000 (JP) ........................................ 2000-164074

(51) Int. Cl.[7] .................................................. G01J 3/12
(52) U.S. Cl. ...................... 356/331; 356/305; 356/334
(58) Field of Search ................................. 356/305, 326, 356/328, 331, 332, 333, 334

(56) References Cited

U.S. PATENT DOCUMENTS

| | | | |
|---|---|---|---|
| 3,069,966 A | | 12/1962 | White |
| 3,775,010 A | | 11/1973 | Chupp et al. |
| 4,025,196 A | | 5/1977 | Chupp et al. |
| 4,856,897 A | * | 8/1989 | Fateley et al. .............. 356/301 |
| 4,973,159 A | | 11/1990 | Sohma et al. |
| 5,223,405 A | | 6/1993 | Howell et al. |
| 6,166,805 A | * | 12/2000 | Mori et al. .................. 356/334 |

FOREIGN PATENT DOCUMENTS

| | | |
|---|---|---|
| FR | 2754054 | 4/1998 |
| GB | 2204964 | 11/1988 |
| GB | 2357858 | 7/2001 |
| JP | 8-145795 | 7/1996 |

* cited by examiner

Primary Examiner—Mark A. Robinson
(74) Attorney, Agent, or Firm—Dellett and Walters

(57) ABSTRACT

In the monochromator, when measured beam which is diffracted by a plane diffraction grating is collected by a collimator to be returned, the measured beam is displaced by a displacement member in a direction parallel to rulings of the plane diffraction grating and is passed through a first cut-off slit having a slit of a predetermined width formed in a direction perpendicular to the direction of the rulings.

9 Claims, 8 Drawing Sheets

F I G. 2
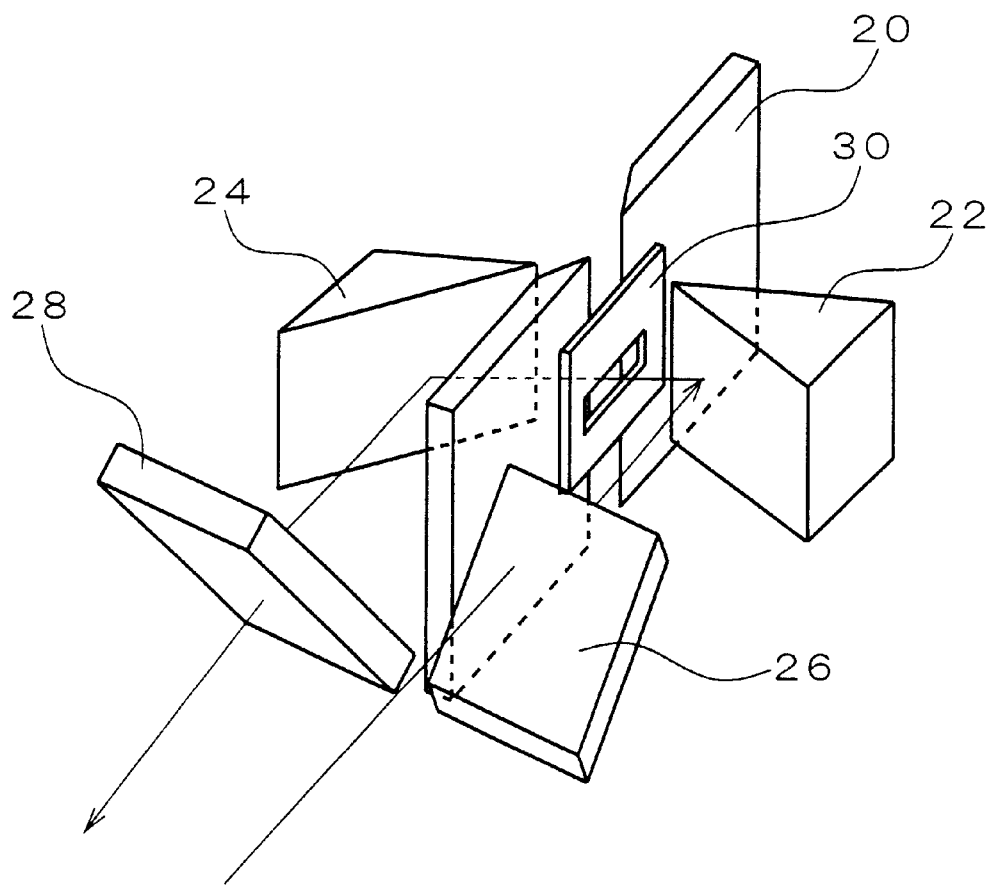
F I G. 3
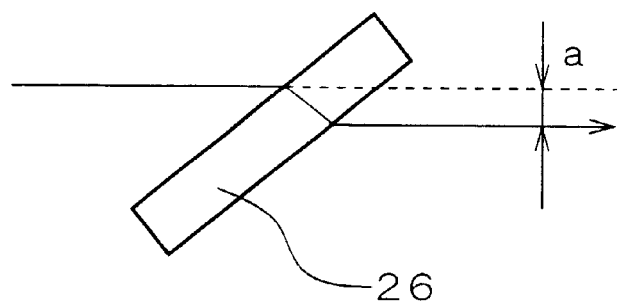

WAVELENGTH SWEEP DIRECTION

MONOCHROMATOR AND SPECTROMETRIC METHOD

BACKGROUND OF THE INVENTION

The present invention relates to a monochromator and a spectrometric method for projecting a measured beam (a beam which is measured) on one and the same diffraction grating a plurality of times.

Conventionally, a spectroscope called "monochromator," has been used as an instrument to measure wavelength characteristics of a measured beam. Particularly, a double monochromator is widely used to allow keeping a high resolution or a wide dynamic range by incidence of a beam into one or more diffraction gratings a plurality of times.

FIG. 9 shows a configuration of a conventional Littrow monochromator. The conventional monochromator shown in FIG. 9 comprises an incident fiber 100, a parabolic mirror 102, a plane diffraction grating 104, an exit slit 106, photodetector 108, an intermediate slit 110, and two return mirrors 112, 114.

In the monochromator shown in FIG. 9, light emitted from the incident fiber 100 is converted into parallel rays by the parabolic mirror 102, and the parallel rays are diffracted by the plane diffraction grating 104. The diffracted beam are returned to the parabolic mirror 102 again, and then returned by the two return mirrors 112 and 114, which are disposed in the vicinity of the focal point of the parabolic mirror 102. Then, the measured beam travels along the same optical path as that along which it has traveled so far in the reverse direction, and is emitted through the exit slit 106, which is disposed in the vicinity of the incident fiber 100, to reach the photodetector 108. In addition, the intermediate slit 110, which has a slit cut in the same direction as the rulings of the plane diffraction grating 104, is disposed between the above mentioned two return mirrors 112 and 114, so that a dynamic range for a wavelength λ of the diffracted beam passing through the exit slit 106 can be increased. The arrangement of the two return mirrors 112 and 114 in a wavelength sweep direction when the plane diffraction grating 104 is rotated shown in FIG. 9 is referred to as an additive dispersion arrangement.

If the additive dispersion arrangement is realized using the return mirrors 112, 114 and intermediate slit 110 as in the case of the conventional monochromator described above, there are a normal optical path and a reverse optical path both passing through the intermediate slit 110, and the light having traveled along the reverse optical path is a stray light, which reaches the vicinity of the exit slit 106. Therefore, the light observed by the photodetector 108 includes both of the light returned by traveling along the normal optical path and the light returned by traveling along the reverse optical path, thereby generating spurious to cause a problem that the dynamic range is decreased.

FIG. 10 is a partial configuration diagram showing the intermediate slit 110 and two return mirrors 112 and 114 of the monochromator shown in FIG. 9. As shown in FIG. 10, in addition to a normal optical path A, there is a reverse optical path B which is opposite in direction to the normal optical path A in the vicinity of the intermediate slit 110. The light having traveled along the normal optical path A reaches the exit slit 106, and the light returned by traveling along the reverse optical path B also reaches the vicinity of the exit slit 106. Therefore, a wavelength component of the light having reached the photodetector 108 by traveling along the normal optical path A has a spurious of a wavelength component of the light having reached the photodetector 108 by traveling along the reverse optical path B.

SUMMARY OF THE INVENTION

The present invention is devised in view of such a problem, and an object of the present invention is to provide a monochromator and a spectrometric method that ensure a wide dynamic range by eliminating a stray light in a reverse optical path.

The monochromator according to the present invention has a return mechanism for returning measured beam which is diffracted by a plane diffraction grating and collected by a collimator, and the return mechanism has return mirrors disposed side-by-side in a wavelength sweep direction, a displacement member for displacing the measured beam in a direction parallel to rulings of the plane diffraction grating, and a cut-off plate disposed in the vicinity of the return mirrors along the normal optical path.

Furthermore, according to the spectrometric method of the present invention, when the measured beam which is diffracted by the plane diffraction grating is to be returned after being collected by a collimator, the beam is displaced by a displacement member in a direction parallel to rulings of the plane diffraction grating and is passed through a cut-off plate disposed in a position along the normal optical path of the measured beam.

It is provided that the measured beam traveling along the normal optical path passes through near the cut-off plate when it is displaced by the displacement member. However, when the measured beam travels along the reverse optical path, this condition is not satisfied, so that the measured beam is cut of f by the cut-off plate. Thus, the stray light, which occurs when the measured beam travels along the reverse optical path, can be prevented, so that it is possible to suppress the occurrence of the spurious and ensure a wide dynamic range.

Especially, it is desirable that the above-mentioned cut-off plate is a first cut-off slit having a slit of a predetermined width formed in a direction perpendicular to the rulings of the plane diffraction grating. Or, it is desirable that an upper side or a lower side of the above-mentioned cut-off plate is disposed in the vicinity of the normal optical path. It is possible to return only the measured beam along the normal optical path and eliminate the stray light along the reverse optical path accurately by the above-mentioned first cut-off slit or the above-mentioned arrangement of the first cut-off slit.

Moreover, it is required that the above-described displacement member is a plate-like member made of a transparent material and a surface of the plate-like member serving as an incidence plane is required to be inclined with respect to a travelling path of the measured beam. When beam is launched into a surface of the plate-like member, the beam is diffracted two times by the surface and a back surface, so that an exit beam parallel to the incident beam is obtained. Thus, since the displacement member can be constituted by a plate-like member having a simple configuration, it is possible to reduce costs of parts.

In addition, it is required that an amount of displacement by the above-described displacement member is larger than the width of the slit formed in the first cut-off slit. Because of this, it is possible to eliminate the measured beam along the reverse optical path accurately by the first cut-off slit.

In addition, it is desirable that the monochromator further comprises a photodetector for detecting the above-described measured beam, an exit slit which is disposed in the vicinity of the photodetector and on an incidence side of the measured beam and has a slit formed in the direction parallel to the rulings of the plane diffraction grating, and a second cut-off slit which is disposed in the vicinity of the exit slit and has a slit formed in the direction perpendicular to the rulings of the plane diffraction grating. Since the measured beam having passed through the exit slit and second cut-off slit detected by the photodetector, it is possible to ensure a further increased dynamic range by restricting the light-receiving range of the photodetector.

BRIEF DESCRIPTION OF THE DRAWINGS

FIG. 2 is an enlarged view of the return mechanism configured by comprising the intermediate slit;

FIG. 3 is a cross-sectional view of one glass plate included in the return mechanism showed in FIG. 2;

DESCRIPTION OF THE PREFERRED EMBODIMENT

Embodiments of a monochromator to which the present invention is applied will be described below with reference to the drawings.

[First embodiment]

Figure 1:
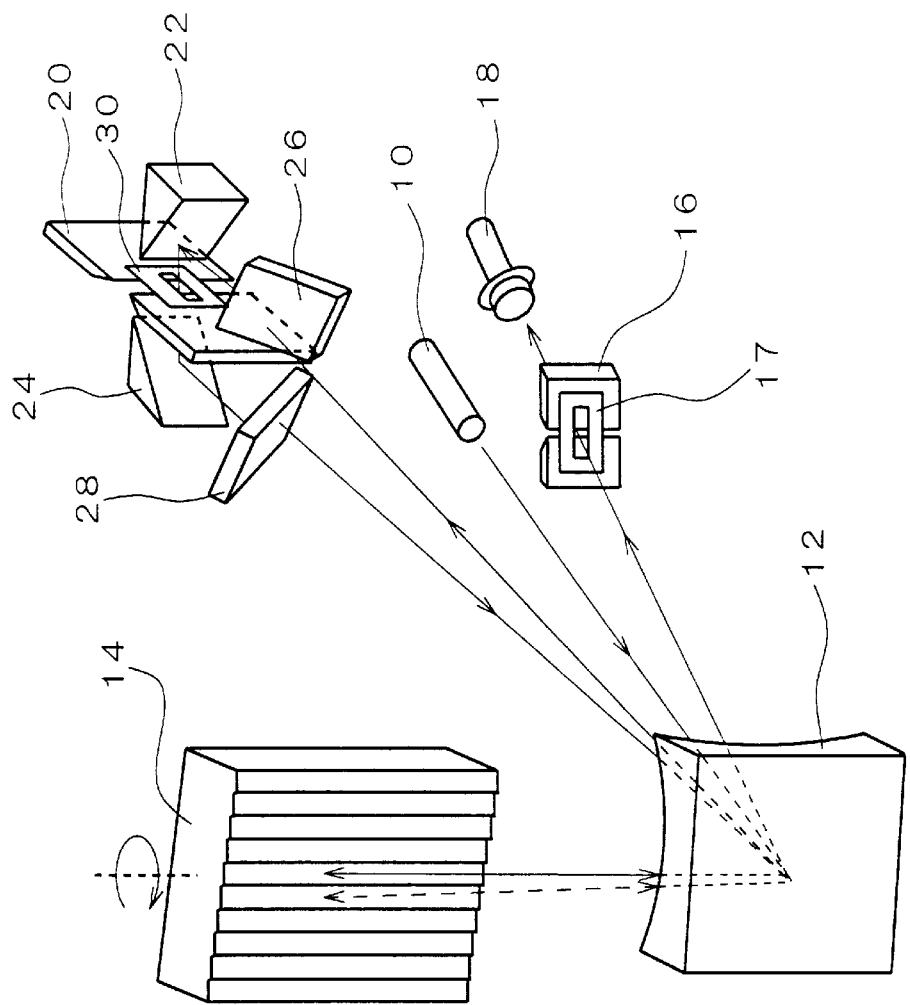
FIG. 1 is a view showing the configuration of a monochromator of a first embodiment.

FIG. 1 shows a configuration of a monochromator of a first embodiment, which is a configuration of a Littrow monochromator. As shown in FIG. 1, the monochromator according to this embodiment comprises an incident fiber 10, a parabolic mirror 12, a plane diffraction grating 14, an exit slit 16, a photodetector 18, an intermediate slit 20, two return mirrors 22, 24, glass plates 26, 28, and cut-off slits 17, 30.

The incident fiber 10 is used for emitting measured beam toward the parabolic mirror 12. An emitting end (the position of an end for emission) of the incident fiber 10 is disposed in the vicinity of a focal point of the parabolic mirror 12, and the measured beam, which is radially emitted from the emitting end of the incident fiber 10, is reflected by the parabolic mirror 12 and converted into parallel rays.

In addition, at another point in the vicinity of the focal point of the parabolic mirror 12, there is disposed the exit slit 16. The parallel rays incident on the parabolic mirror 12 is reflected therefrom and collected in the exit slit 16. By passing through the exit slit 16, the measured beam has its undesired wavelength component removed, and then is launched into the photodetector 18. The photodetector 18 detects an intensity of the beam launched thereto through the exit slit 16.

The plane diffraction grating 14 has rulings formed in a predetermined direction at regular intervals and diffracts the measured beam, which is launched thereto from the parabolic mirror 12. In FIG. 1, a plurality of parallel grooves is formed vertically. A rotary drive mechanism (not illustrated) such as a motor, which has a rotation axis parallel to the rulings, is attached to the plane diffraction grating 14, and thus the plane diffraction grating 14 can be rotated about the rotation axis by the rotary drive mechanism.

The two return mirrors 22, 24 are intended for reflecting back the beam collected by the parabolic mirror 12 toward the parabolic mirror 12. These two return mirrors 22, 24 are arranged side-by-side in a direction in which the beam emitted from the parabolic mirror 12 moves when the plane diffraction grating 14 is rotated about the rotation axis parallel to the rulings. The measured beam which is emitted by the parabolic mirror 12 is reflected by one return mirror 24 at an angle of substantial 90 degree, and the beam having passed through the intermediate slit 20 disposed at a position where the reflected beam is collected is reflected by the other return mirror 24 at an angle of substantial 90 degree and returned to the parabolic mirror 12.

In this embodiment, two glass plates 26, 28 are disposed in the vicinity of the above-described two return mirrors 22, 24 and between the respective mirrors and the parabolic mirror 12. In addition, the cut-off slit 30 is disposed to cross the intermediate slit 20 side by side. Furthermore, the cut-off slit 17 is disposed to cross the exit slit 16.

Figure 4:
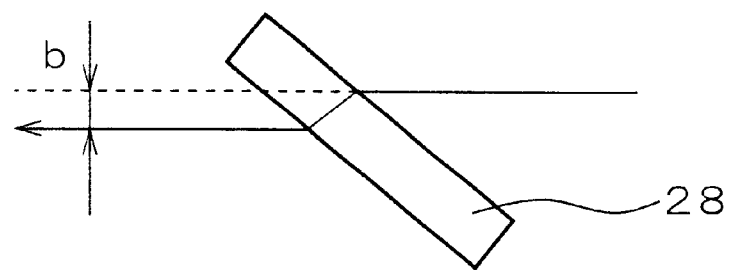
FIG. 4 is a cross-sectional view of the other glass plate included in the return mechanism showed in FIG. 2.

FIG. 2 is an enlarged view of the return mechanism configured by comprising the intermediate slit 20. FIG. 3 is a cross-sectional view of one glass plate 26, which shows a transmission state of the measured beam. In addition, FIG. 4 is a cross-sectional view of the other glass plate 28, which shows a transmission state of the measured beam.

The glass plate 26 is inclined with respect to the direction of travel of the measured beam. Therefore, the measured beam, which has reached the glass plate 26, is refracted when it passes through the respective surfaces of the glass plate 26, so that it reaches the return mirror 22 with being displaced by a predetermined distance a downwardly from and parallel to the measured beam before reaching the glass plate 26. The cut-off slit 30 has a horizontal slit at a position where the measured beam, which has passed through the glass plate 26, reaches the intermediate slit 20 after being reflected by the return mirror 22.

Similarly, the other glass plate 28 is inclined with respect to the direction of travel of the measured beam. Therefore, the measured beam, which has reached the glass plate 28, is refracted when it passes through the respective surfaces of the glass plate 28, so that it is displaced by a predetermined distance b downwardly from and parallel to the measured beam before reaching the glass plate 28.

A width c of the slit of the cut-off slit 30 is set at a value smaller than the displacement a of the measured beam due to the glass plate 26 and the displacement b of the measured beam due to the glass plate 28.

The glass plates 26, 28 correspond to the displacement member. The intermediate slit 20, return mirrors 22, 24, glass plates 26, 28, and cut-off slit 30 correspond to the return mechanism. Furthermore, the cut-off slit 30 corresponds to the first cut-off slit, and the cut-off slit 17 corresponds to the second cut-off slit.

The monochromator according to this embodiment has such a configuration, and now, the operation thereof will be described. The measured beam which is introduced from outside via the incident fiber 10 is reflected and diffracted by the parabolic mirror 12 and the plane diffraction grating 14, respectively, and then collected by the parabolic mirror 12. As described above, the measured beam which is collected by the parabolic mirror 12 passes through one glass plate 26, is reflected by one return mirror 22 to have its direction of travel changed at an angle of 90 degree, passes through the intermediate slit 20 and cut-off slit 30 disposed at a position where beam is collected, is reflected by the other return mirror 24 to have its direction of travel changed at an angle of 90 degree, and thus is returned toward the parabolic mirror 12 side through the other glass plate 28. The measured beam, which is launched to the parabolic mirror 12 again in this way, travels along the optical path along which it has traveled so far in the reverse direction and reaches the photodetector 18 after passing through the exit slit 16 and cut-off slit 17 disposed in the vicinity of the focal point of the parabolic mirror 12.

Thus, in the monochromator according to this embodiment, the dynamic range can be increased, since an undesired wavelength component is removed from the measured beam by passing the beam through the exit slit 16 as well as the intermediate slit 20. In addition, the cut-off slit 30 is disposed at the position of the intermediate slit 20, and the measured beam having passed through the cut-off slit 30 is displaced by the glass plate 28 by the predetermined distance b in the direction of the rotation axis of the plane diffraction grating 14, so that the measured beam, which enters the intermediate slit 20 by traveling along the reverse optical path which is opposite in direction to the normal optical path, is cut off by the cut-off slit 30. Therefore, since the measured beam, which reaches the photodetector 18 by traveling along the reverse optical path, is removed, it is possible to prevent the spurious due to stray light to occur and ensure a further increased dynamic range.

Furthermore, in the monochromator according to this embodiment, the cut-off slit 17 is disposed at the position of the exit slit 16, so that it is possible to ensure a further increased dynamic range by restricting the light-receiving range (an incidence area determined by a formula: (a width of the slit of the exit slit 16)×(a width of the slit of the cut-off slit)) of the photodetector 18.

Figure 5:
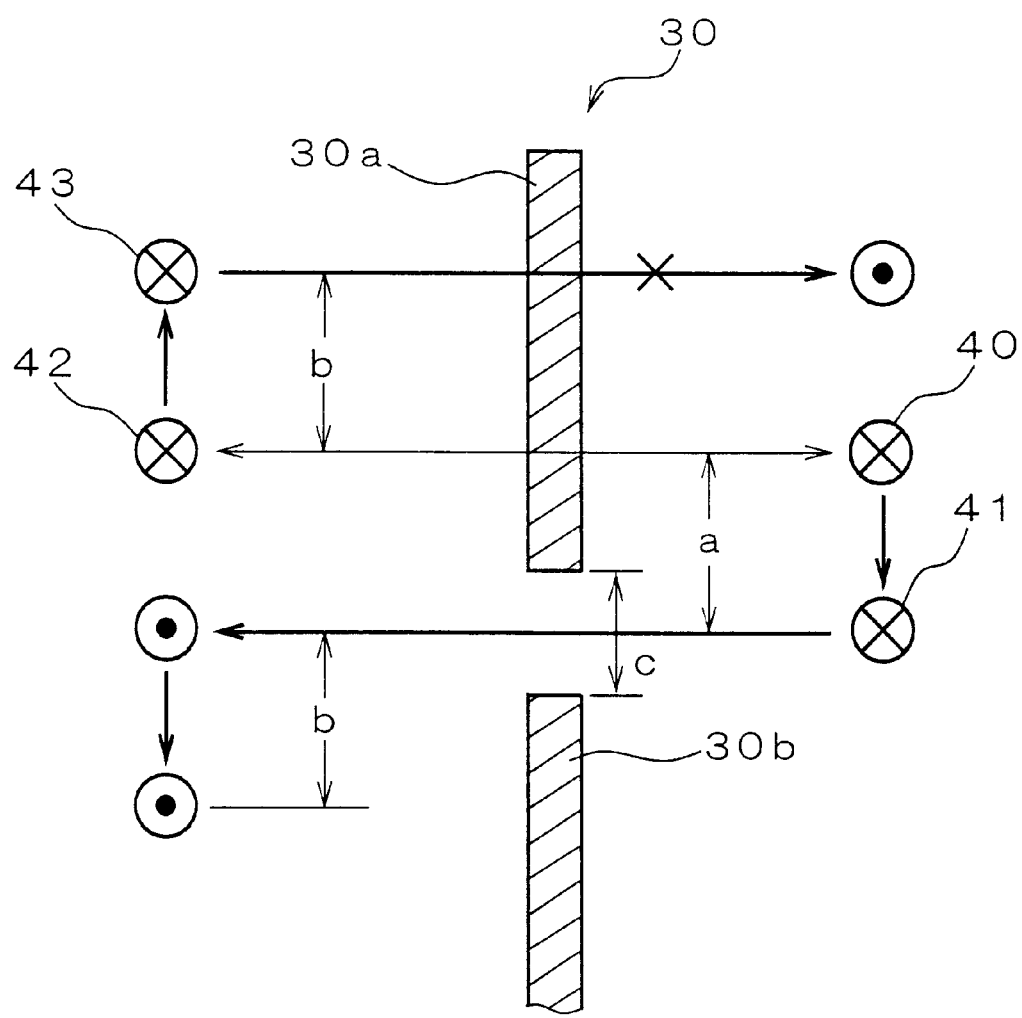
FIG. 5 is a diagram for comparison between the paths of the measured beam traveling along the normal optical path and the measured beam traveling along the reverse optical path.

FIG. 5 is a diagram for comparison between the paths of the measured beam traveling along the normal optical path and the measured beam traveling along the reverse optical path. In case of the normal optical path, the measured beam 40 having reached one glass plate 26 is displaced downwardly by the predetermined distance a, and this measured beam 41 after displacement is reflected by one return mirror 22 to pass through the cut-off slit 30. On the other hand, in case of the reverse optical path, the measured beam 42 having reached the other glass plate 28 is displaced upwardly by the predetermined distance b, and this measured beam 43 after displacement is reflected by the other return mirror 24 to reach the cut-off slit 30. In the cut-off slit 30, however, the slit is formed at a level lower than that of the measured beam 42 before reaching the glass plate 28 by the predetermined distance a, so that the above-described measured beam which travels along the reverse optical path and is reflected by the return mirror 24 to reach the cut-off slit 30 cannot pass through the cut-off slit 30, whereby its influence on detection results obtained by the photodetector 18 is eliminated.

[Second Embodiment]

Figure 6:
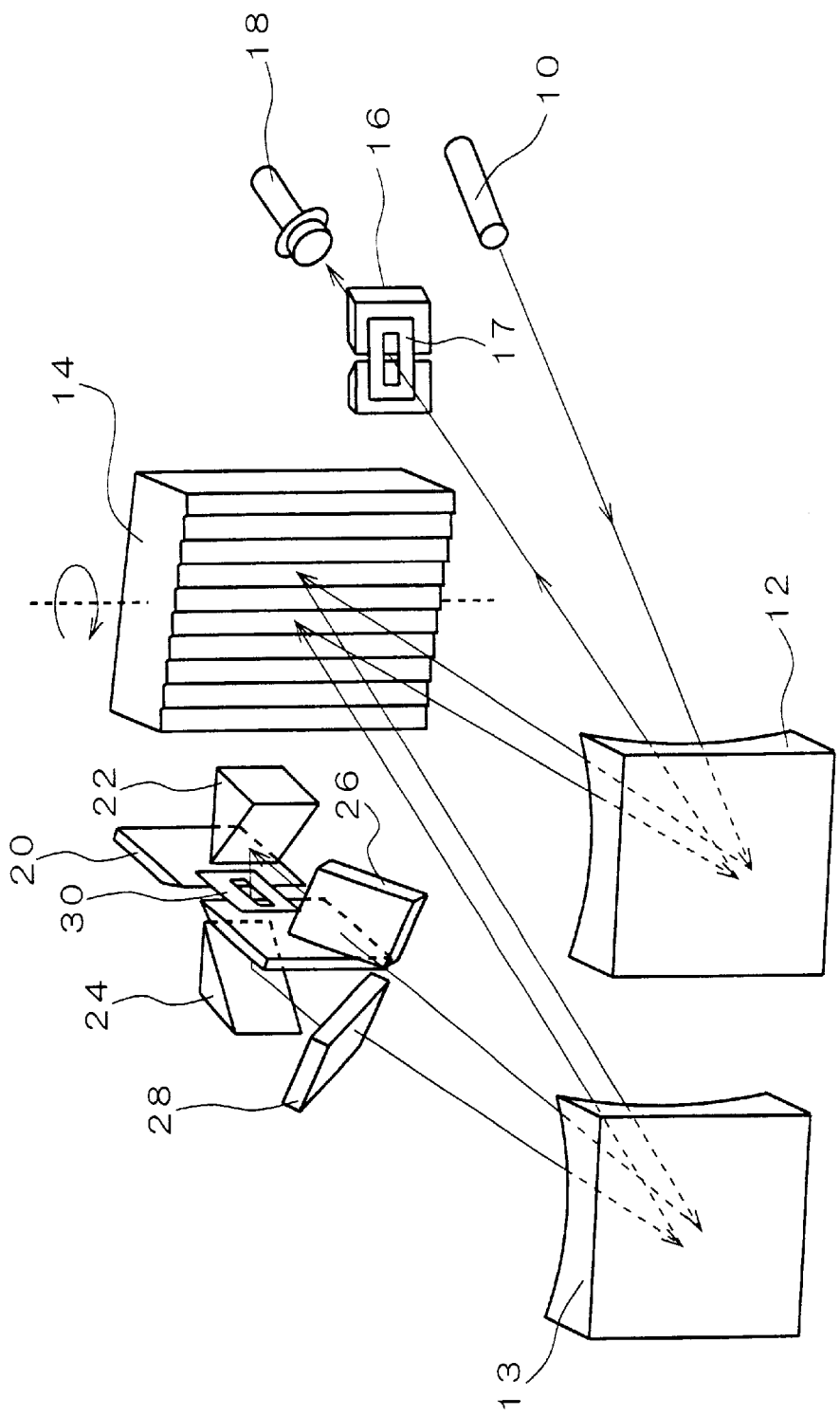
FIG. 6 is a view showing the configuration of a monochromator of a second embodiment.

FIG. 6 shows a configuration of a monochromator according to a second embodiment, which shows a configuration of a Czerny-Turner monochromator. The monochromator shown in FIG. 6 comprises an incident fiber 10, two parabolic mirrors 12,13, a plane diffraction grating 14, an exit slit 16, a photodetector 18, an intermediate slit 20, two return mirrors 22, 24, glass plates 26, 28, and cut-off slits 17, 30. The monochromator shown in FIG. 6 is different from the monochromator shown in FIG. 1 in that the parabolic mirror 13 is added thereto, and the return mechanism comprising the return mirror 22 and the like is disposed in the vicinity of the focal point of this additional parabolic mirror 13.

The measured beam, which is introduced from, outside via the incident fiber 10 is reflected and diffracted by one parabolic mirror 12 and the plane diffraction grating 14, respectively, and then collected by the other parabolic mirror 13. The measured beam which is collected by the parabolic mirror 13 passes through one glass plate 26, is reflected by one return mirror 22 to have its direction of travel changed at an angle of 90 degree, passes through the intermediate slit 20 and cut-off slit 30 disposed at a position where beam is collected, is reflected by the other return mirror 24 to have its direction of travel changed at an angle of substantial 90 degree, and thus is returned toward the parabolic mirror 13 through the other glass plate 28. The measured beam, which is launched to the parabolic mirror 13 again in this way, travels along the optical path along which it has traveled so far in the reverse direction and reaches the photodetector 18 after passing through the exit slit 16 and cut-off slit 17 disposed in the vicinity of the focal point of the parabolic mirror 12.

Thus, as in the monochromator of the first embodiment shown in FIG. 1, the monochromator according to this embodiment is provided with the intermediate slit 20 as well as the exit slit 16, so that it is possible to ensure a further increased dynamic range. In addition, since the number of times of diffraction by the plane diffraction grating 14 is two, it is possible to enhance the resolution.

In addition, since using the glass plates 26, 28 allows the positions of the beam traveling along the normal optical path and beam traveling along the reverse optical path in the vicinity of the intermediate slit 20 can be different from each other in the direction of the rulings of the plane diffraction grating 14, only the beam traveling along the reverse optical path can be removed by the cut-off slit 30 by placing the cut-off slit 30 at the position of the intermediate slit 20. In addition, the light-receiving range of the photodetector 18 can be restricted by placing the cut-off slit 17 at the position of the exit slit 16, so that the stray light launched to the photodetector 18 by traveling along the reverse optical path can be further reduced. Therefore, it is possible to suppress the occurrence of the spurious and ensure a further increased dynamic range.

[Third Embodiment]

Figure 7:
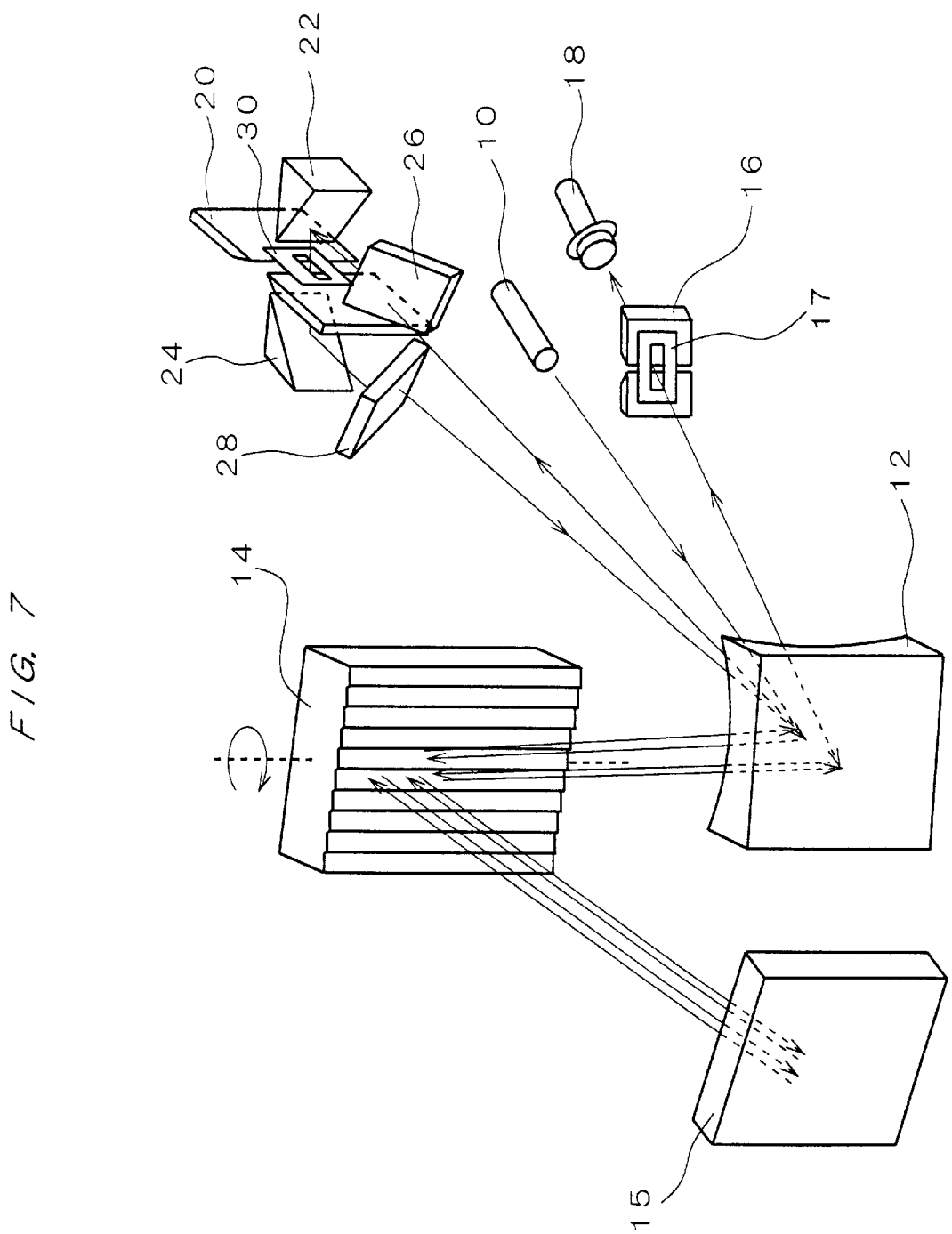
FIG. 7 is a view showing the configuration of a monochromator of a third embodiment.

FIG. 7 shows a configuration of a monochromator according to a third embodiment. The monochromator shown in FIG. 7 comprises an incident fiber 10, a parabolic mirror 12, a plane diffraction grating 14, a plane mirror 15, an exit slit 16, a photodetector 18, an intermediate slit 20, two return mirrors 22, 24, glass plates 26, 28, and cut-off slits 17, 30. The configuration of the monochromator shown in FIG. 7 is the configuration of the monochromator shown in FIG. 1 to which the plane mirror 15 is added, so that the number of times of diffraction by the plane diffraction grating 14.

The measured beam which is introduced from outside via the incident fiber 10 is reflected and diffracted by the parabolic mirror 12 and the plane diffraction grating 14, respectively, and reflected by the plane mirror 15. Then, it is diffracted by the plane diffraction grating 14 for the second time, and collected by the parabolic mirror 12. As in the first embodiment, the measured beam which is collected by the parabolic mirror 12 passes through one glass plate 26, is reflected by the return mirror 22 to have its direction of travel changed at an angle of 90 degree, passes through the intermediate slit 20 and cut-off slit 30 disposed at a position where beam is collected, is reflected by the other return mirror 24 to have its direction of travel changed at an angle of substantial 90 degree, and thus is returned toward the parabolic mirror 12 side through the other glass plate 28. The measured beam, which is launched to the parabolic mirror 12 again in this way, travels along the optical path along which it has traveled so far in the reverse direction and reaches the photodetector 18 after passing through the exit slit 16 and cut-off slit 17 disposed in the vicinity of the focal point of the parabolic mirror 12.

In this way, the monochromator according to this embodiment allows the resolution thereof to be enhanced by adding the plane mirror 15 to the monochromator according to the monochromator shown in FIG. 1 or FIG. 6 to double the number of times of diffraction by the plane diffraction grating 14.

In addition, since using the glass plates 26, 28 allows the positions of the beam traveling along the normal optical path and beam traveling along the reverse optical path in the vicinity of the intermediate slit 20 can be different from each other in the direction of the rulings of the plane diffraction grating 14, only the beam traveling along the reverse optical path can be removed by the cut-off slit 30 by placing the cut-off slit 30 at the position of the intermediate slit 20. In addition, the light-receiving range of the photodetector 18 can be restricted by placing the cut-off slit 17 at the position of the exit slit 16, so that the stray light launched to the photodetector 18 by traveling along the reverse optical path can be further reduced. Therefore, it is possible to suppress the occurrence of the spurious and ensure a wide dynamic range.

[Fourth Embodiment]

Figure 8:
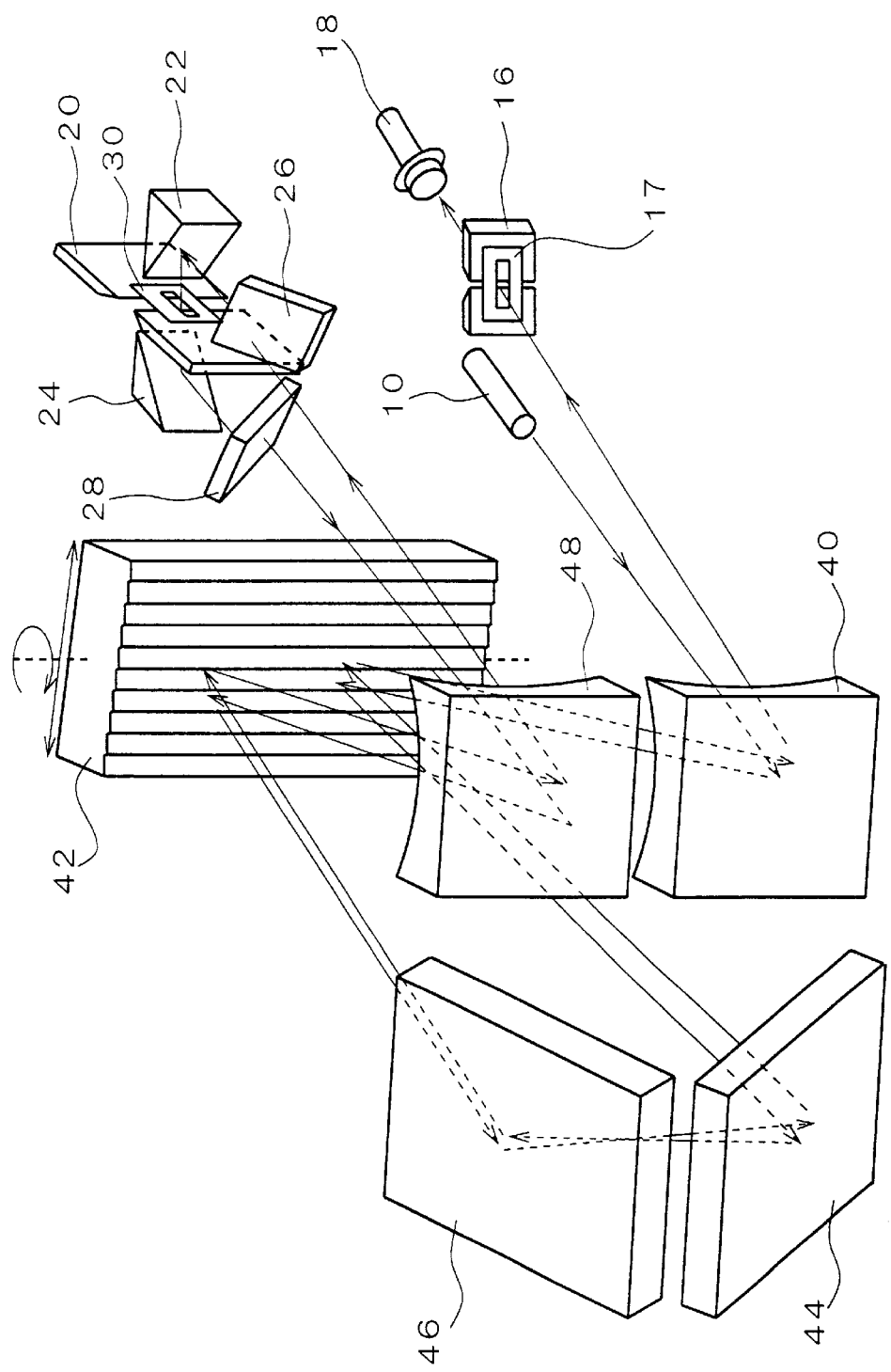
FIG. 8 is a view showing the configuration of a monochromator of a fourth embodiment.
Figure 9:
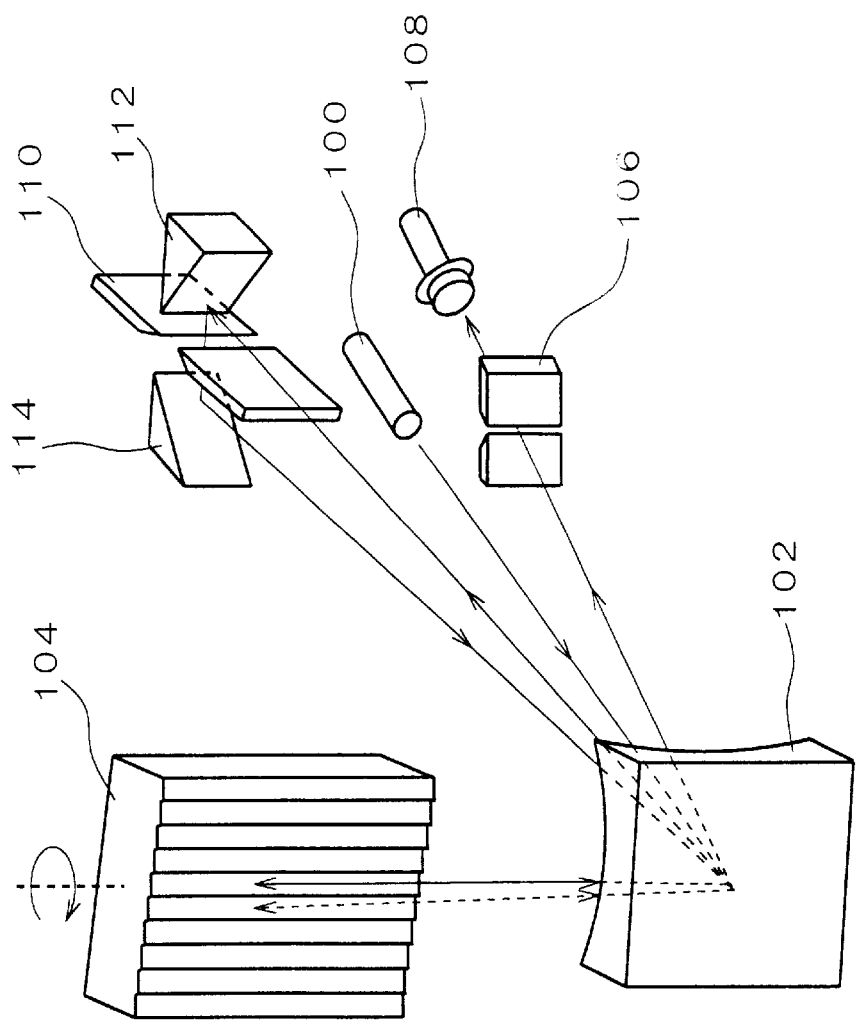
FIG. 9 is a view showing the configuration of a conventional Littrow monochromator.
Figure 10:
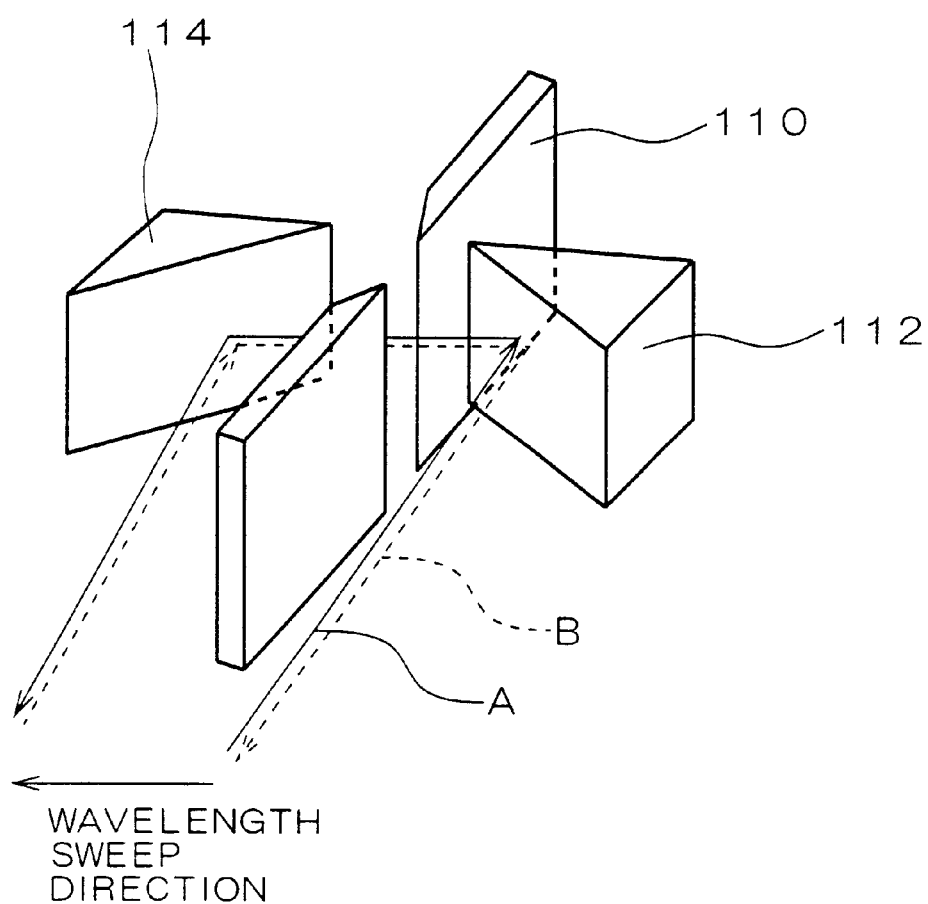
FIG. 10 is a partial configuration diagram showing the intermediate slit and two return mirrors of the monochromator shown in FIG. 9.

FIG. 8 shows a configuration of a monochromator according to a fourth embodiment. The monochromator shown in FIG. 8 comprises an incident fiber 10, two parabolic mirrors 40, 48, a plane diffraction grating 42, two plane mirrors 44, 46, an exit slit 16, a photodetector 18, an intermediate slit 20, two return mirrors 22, 24, glass plates 26, 28, and cut-off slits 17, 30.

The two plane mirrors 40, 48 are disposed apart from each other by a predetermined distance in the direction of the rulings of the plane diffraction grating 42. The emitting end of the incident fiber 10 is disposed at the position of the focal point of one parabolic mirror 40, and the measured beam, which is radially emitted from the emitting end of the incident fiber 10, is reflected by the parabolic mirror 40 and converted into parallel rays. In addition, in the vicinity of the focal point of the other parabolic mirror 48, there is disposed the return mechanism comprising the return mirror 22 and the like, and the parallel rays incident on the parabolic mirror 48 is reflected therefrom and collected in the vicinity of the return mechanism.

The two plane mirrors 44, 46 are disposed apart from each other in the direction of the rulings of the plane diffraction grating 42. One plane mirror 44 reflects the beam, which is diffracted by the plane diffraction grating 42 in a direction parallel to the rulings of the plane diffraction grating 42 at an angle of substantial 90 degree. The other plane mirror 46 further reflects the measured beam, which is reflected by the plane mirror 44 at an angle of substantial 90 degree. By these two plane mirrors 44, 46, the measured beam, which is emitted by the plane diffraction grating 42, is returned to the plane diffraction grating 42.

The measured beam which is introduced from outside via the incident fiber 10 is reflected or diffracted by one parabolic mirror 40, the plane diffraction grating 42, one plane mirror 44, the other plane mirror 46, and the plane diffraction grating 42, and then collected by the other parabolic mirror 48. The measured beam, which is collected by the parabolic mirror 48, passes through one glass plate 26, and then is reflected by one return mirror 22 to have its direction of travel changed at an angle of 90 degree. It is then passes through the intermediate slit 20 and cut-off slit 30 disposed at a position where beam is collected, is reflected by the other return mirror 24 to have its direction of travel changed at an angle of substantial 90 degree, and then is returned toward the parabolic mirror 48 through the other glass plate 28. The measured beam, which is launched to the parabolic mirror 48 again in this way, travels along the optical path along which it has traveled so far in the reverse direction and reaches the photodetector 18 after passing through the exit slit 16 and cut-off slit 17 disposed in the vicinity of the focal point of the parabolic mirror 40.

Thus, in the monochromator according to this embodiment, the diffracted beam emitted from the plane diffraction grating 42 is launched into the plane diffraction grating 42 again by using the two plane mirrors 44, 46 to return the beam at an angle of substantial 180 degree. Thus, the measured beam, which is launched by the incident fiber 10, is diffracted twice by the same plane diffraction grating 42 until it reaches the other parabolic mirror 48. Furthermore, the measured beam then travels along the optical path along which it has traveled so far in the reverse direction after passing through the intermediate slit 20 and the like disposed in the vicinity of the focal point of the parabolic mirror 48, so that it is diffracted by the plane diffraction grating 42 two more times. Therefore, the number of times of diffraction is increased, so that the resolution can be enhanced.

In addition, using the two plane mirrors 44, 46 and two parabolic mirror 40, 48 allows the optical path of the measured beam traveling between the incident fiber 10 or exit slit 16 and one plane mirror 44 and the optical path of the measured beam traveling between the intermediate slit 20 and the other plane mirror 46 to be apart from each other in the direction of the rulings of the plane diffraction grating 14. Therefore, the position where the incident fiber 10 and exit slit 16 are disposed and the position where the two return mirrors 22, 24 are disposed can be apart from each other, so that it is possible to avoid complicating the portions where they are mounted. In addition, a degree of freedom of the design is improved and mounting of those components is more easily accomplished.

In addition, since using the glass plates 26, 28 allows the positions of the beam traveling along the normal optical path and beam traveling along the reverse optical path in the vicinity of the intermediate slit 20 can be different from each other in the direction of the rulings of the plane diffraction grating 42, only the beam traveling along the reverse optical path can be removed by the cut-off slit 30 disposed at the position of the intermediate slit 20. In addition, the light-receiving range of the photodetector 18 can be restricted by placing the cut-off slit 17 at the position of the exit slit 16, so that the stray light launched to the photodetector 18 by traveling along the reverse optical path can be further reduced. Therefore, it is possible to suppress the occurrence of the spurious and ensure a wide dynamic range.

The present invention is not limited to the embodiments described above, and various modifications can be devised within the spirit and scope of the present invention. For example, while in the above-described embodiments, along the normal optical path, one glass plate 26 is disposed before one return mirror 22, and the other glass plate 28 is disposed after the other return mirror 24, only one of the two glass plate 26, 28 may be used.

In addition, as shown in FIG. 5, only the upper piece 30a of the cut-off slit 30 contributes to elimination of the stray light. For this reason, the cut-off plate having only the upper piece may be used in place of the cut-off slit 30, while the cut-off slit 30 is disposed to cross the intermediate slit 20, in the above-mentioned embodiments. In this case, the cut-off plate is disposed at the position where the lower side of the cut-off plate is arranged in the vicinity of the normal optical path of the measured beam. In the case where the angles of the inclination of the glass plates 26, 28 are set so as to in the opposite directions each other, only the lower piece 30b of the cut-off slit 30 shown in FIG. 5 contributes to elimination of the stray light. Therefore, the cut-off plate having only the lower piece 30b may be used as substitute for the cut-off slit 30. In this case, it is required that the cut-off plate is disposed at the position where the upper side of the cut-off plate is arranged in the vicinity of the normal optical path of the measured beam.

What is claimed is:

1. A monochromator comprising a return mechanism for returning measured beam, which is diffracted by a plane diffraction grating and collected by a collimator, wherein the return mechanism having:
   return mirrors for returning said measured beam, disposed side-by-side in a wavelength sweep direction when said plane diffraction grating is rotated;
   a displacement member for displacing said measured beam in a direction of rulings of said plane diffraction grating, disposed in the vicinity of said return mirrors along a normal optical path; and
   a cut-off plate which is disposed in the vicinity of said return mirrors along said normal optical path.

2. The monochromator according to claim 1, wherein said cut-off plate is a first cut-off slit having a slit of predetermined width formed in a direction perpendicular to the direction of the rulings of said plane diffraction grating.

3. The monochromator according to claim 1, wherein an upper side or a lower side of said cut-off plate is disposed in the vicinity of said normal optical path.

4. The monochromator according to claim 2, wherein said displacement member is a plate-like member made of a transparent material and a surface of said plate-like member serving as an incidence plane is inclined with respect to a direction of travel of said measured beam.

5. The monochromator according to claim 4, wherein an amount of displacement by said displacement member is larger than the width of said slit formed in said first cut-off slit.

6. The monochromator according to claim 2, further comprising:
   a photodetector for detecting said measured beam;
   an exit slit which is disposed in the vicinity of said photodetector and on an incidence side of said measured beam and has a slit formed in the direction parallel to the rulings of said plane diffraction grating; and
   a second cut-off slit which is disposed in the vicinity of said exit slit and has a slit formed in the direction perpendicular to the rulings of said plane diffraction grating.

7. A spectrometric method, wherein a monochromator for returning a measured beam, which is diffracted by a plane diffraction grating and collected by a collimator is used, the spectrometric method comprising the steps of:
   returning said measured beam by return mirrors disposed side-by-side in a wavelength sweep direction generated when said plane diffraction grating is rotated;
   displacing said measured beam in a direction of rulings of said plane diffraction grating by a displacement member disposed in the vicinity of said return mirrors along a normal optical path; and
   cutting off beam travel along an optical path other than said normal optical path by a cut-off plate which is disposed in the vicinity of said return mirrors along said normal optical path.

8. The spectrometric method according to claim 7, wherein said cut-off plate is a first cut-off slit having a slit of predetermined width formed in a direction perpendicular to the direction of the rulings of said plane diffraction grating.

9. The spectrometric method according to claim 7, wherein an upper side or a lower side of said cut-off plate is disposed in the vicinity of said normal optical path.

* * * * *